S. Vansyckel,
Furnace-Grate Bar.
N° 11,879.   Patented Oct. 31, 1854.

UNITED STATES PATENT OFFICE.

SAMUEL VANSYCKEL, OF LITTLE YORK, NEW JERSEY.

GRATE-BAR.

Specification forming part of Letters Patent No. 11,879, dated October 31, 1854; Reissued June 9, 1868, No. 2,980.

*To all whom it may concern:*

Be it known that I, SAMUEL VANSYCKEL, of Little York, in the county of Hunterdon and State of New Jersey, have invented certain new and useful Improvements in the Construction of Grate-Bars; and I do hereby declare the following to be a full, clear, and exact description of the same, reference being had to the accompanying drawings, making a part of this specification, in which—

Figure 1:
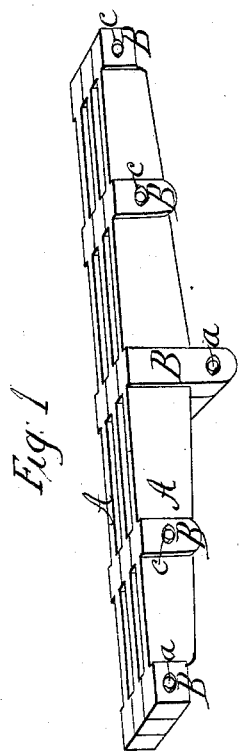
Figure 2:
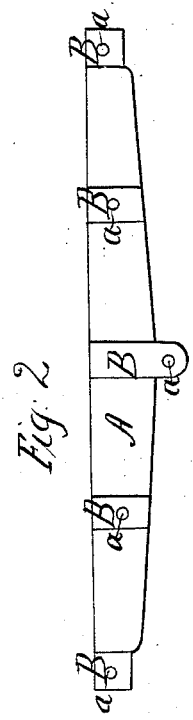

Figure 1, represents a perspective view of the bars together. Fig. 2, represents one bar of the pairs or sets, and Fig. 3, represents another of the pair or sets, detached.

Letters Patent of the United States, were granted to me on the 23d day of August 1853, for " forming a hook or catch upon the under side of the grate bars, and passing through or over said hooks or catches a holding bar to prevent twisting or warping."

The nature of my present invention consists in the casting or otherwise forming of the connections in the braces or projections of the bars themselves, whether these braces extend from top to bottom of the bars, or below the bars, as will be hereafter described.

The object of the invention is to have single bars, so that any broken or injured one may be removed, and to prevent warping or twisting of the bars by heat, as set forth in my patent before referred to.

To enable others skilled in the art to make and use my invention, I will proceed to describe the same with reference to the drawings.

Figure 3:
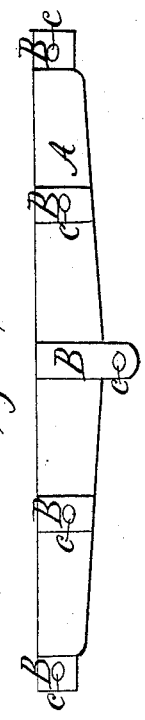

A, represents the grate bars, which may be constructed of any suitable size and form, and B, B, &c., the braces or projections thereon, for keeping the bars at sufficient distances apart, to make space enough for draft, and to rake the fire. These bars A, are cast in pairs or sets—one of each being represented in Figs. 2 and 3. Of that represented in Fig. 2, *a*, *a*, are pins or dowels cast or otherwise secured to the bar, and may project from each side of the bar, to a distance equal to about half the width of
the bar at the braces. Or the pin or dowel
may extend on one side only of the bar, and reach toward the center of the bar, with a hole opposite to it, for a similar dowel on the next bar to enter. These pins, dowels, or catches, may be round, square, angular or oblong,—the opening into which they enter or catch being of a similar shape or form. In Fig. 3, is the other bar of the pair or set, it being represented with openings or holes *c*, *c*, &c., through the bar at each of the braces or projections. The pins or dowels on the one bar, enter these openings in the other, and thus the whole series are firmly held together to prevent their warping, twisting, or dropping from the end plates or walls. The openings *c*, *c*, should be enlarged in the direction of the length of the bar, for the purpose of allowing for the unequal expansion of the metal in the bar and in the pins or dowels—the latter being protected from immediate contact with the fire, while the bars are in direct contact. The expansion in the transverse direction is not of sufficient consequence, to make any very special provision for it.

The braces B, may all, or any portion of them extend down below the bottom of the bar, as does the center one of each bar, or they may all be between the bars without extending above or below it. And more or less of these braces than here represented may be used.

Having thus fully described the nature of my invention and shown the difference between it, and what has heretofore been done, what I claim therein as new and desire to secure by Letters Patent, is—

The casting or forming of the pin, dowel or catch in one bar or set, with a corresponding hole or its equivalent in the next bar or set, so that when put together they shall be held from warping, twisting, or dropping from the end plates or walls, substantially as herein described.

SAM VANSYCKEL.

Witnesses:
GEORGE E. CUTTER,
G. ROSS CARY.